[12] United States Patent  
Ho

(10) Patent No.: US 7,003,405 B1
(45) Date of Patent: Feb. 21, 2006

(54) METHODS FOR CHARACTERIZING SUBSURFACE VOLATILE CONTAMINANTS USING IN-SITU SENSORS

(75) Inventor: Clifford K. Ho, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 542 days.

(21) Appl. No.: 10/280,258

(22) Filed: Oct. 25, 2002

Related U.S. Application Data

(63) Continuation-in-part of application No. 10/152,597, filed on May 22, 2002.

(60) Provisional application No. 60/351,526, filed on Jan. 24, 2002, provisional application No. 60/335,644, filed on Oct. 25, 2001.

(51) Int. Cl.
*G01N 31/00* (2006.01)
*G06F 19/00* (2006.01)
*G01V 3/00* (2006.01)
*G01V 1/40* (2006.01)
*G01V 3/18* (2006.01)

(52) U.S. Cl. .......................... 702/32; 436/43; 436/139; 436/140; 436/141; 422/83; 422/68.1; 700/266; 702/1; 702/2; 702/6; 702/9; 702/13; 702/22; 702/23; 702/24; 702/25; 702/30; 702/31; 73/1.01; 73/1.02; 73/23.2

(58) Field of Classification Search ................... 436/43, 436/139, 140, 141; 700/266; 702/1, 2, 6, 702/9, 13, 22, 23, 24, 25, 30, 31, 32; 422/83, 422/68.1; 73/1.01, 1.02, 23.2

See application file for complete search history.

(56) References Cited

U.S. PATENT DOCUMENTS

| 5,264,368 | A |   | 11/1993 | Clarke et al. ................... 436/3 |
|---|---|---|---|---|
| 5,343,771 | A | * | 9/1994 | Turriff et al. ............ 73/864.44 |
| 5,517,868 | A | * | 5/1996 | Turriff et al. ............ 73/864.44 |
| 5,723,769 | A |   | 3/1998 | Barber et al. .............. 73/19.12 |
| 5,773,713 | A |   | 6/1998 | Barber et al. .............. 73/61.41 |
| 5,786,527 | A |   | 7/1998 | Tarte ......................... 73/19.01 |
| 5,992,213 | A |   | 11/1999 | Tartre ........................ 73/19.01 |
| 6,289,714 | B1 | * | 9/2001 | Tartre ........................ 73/19.01 |

OTHER PUBLICATIONS

Ho and Hughes, "*In-Situ Chemiresistor Package for Real-Time Detection of Volatile Organic Compounds in Soil and Groundwater*", Jan. 30, 2002, pp. 23-34.

(Continued)

*Primary Examiner*—Brian J. Sines
(74) *Attorney, Agent, or Firm*—Robert D. Watson

(57) ABSTRACT

An inverse analysis method for characterizing diffusion of vapor from an underground source of volatile contaminant using data taken by an in-situ sensor. The method uses one-dimensional solutions to the diffusion equation in Cartesian, cylindrical, or spherical coordinates for isotropic and homogenous media. If the effective vapor diffusion coefficient is known, then the distance from the source to the in-situ sensor can be estimated by comparing the shape of the predicted time-dependent vapor concentration response curve to the measured response curve. Alternatively, if the source distance is known, then the effective vapor diffusion coefficient can be estimated using the same inverse analysis method. A triangulation technique can be used with multiple sensors to locate the source in two or three dimensions. The in-situ sensor can contain one or more chemiresistor elements housed in a waterproof enclosure with a gas permeable membrane.

23 Claims, 8 Drawing Sheets

OTHER PUBLICATIONS

Ho, Itamura, Kelley and Hughes, *"Review of Chemical Sensors for In-Situ Monitoring of Volatile Contaminants"*, Mar. 2001 pp. 1-28.

Ho and Udell, *"An experimental investigation of air venting of volatile liquid hydrocarbon mistures from homogeneous and heterogeneous porous media"*, Apr. 27, 1992, pp. 289-315.

Ho, "Analytical Inverse Model for Multicomponent Soil Vapor Extraction", Jun. 1998, pp. 504-507.

Ho, Hughes and Jenkins, "Waterproof Microsensor for In-Situ Monitoring of Volatile Compounds", Patent Application, pp. 1-39.

Ho, "Automated Monitoring and Remediation System for Volatile Subsurface Contaminants", Provisional Application, Jan. 23, 2002, pp. 1-10.

Ho, "Characterization Methods for Real-Time In-Situ Sensing of Volatile Contaminants", Provisional Application, Oct. 23, 2001, pp. 1-55.

Milligan, R. J. "Gas Diffusion in Porous Medi, Science", 1959, 130, 100-102.

Fuller, E. N. Schettler, P. D. and Giddings, J.C., "A Comparison of Methods for Predicting Gaseous Diffusion Coefficents," J. Gas Chromatography 1965, 220227.

* cited by examiner

METHODS FOR CHARACTERIZING SUBSURFACE VOLATILE CONTAMINANTS USING IN-SITU SENSORS

CROSS-REFERENCE TO RELATED APPLICATIONS

This application is a continuation-in-part of U.S. application Ser. No. 10/152,597 filed May 22, 2002, "Waterproof Microsensor for In-Situ Monitoring of Volatile Compounds", by Clifford K. Ho, et al., which is incorporated herein by reference. This application claims the benefit of U.S. Provisional application Ser. No. 60/335,644 filed Oct. 25, 2001, "Characterization Methods for Real-Time In-Situ Sensing of Volatile Contaminants", by Clifford K. Ho, which is incorporated herein by reference. This application also claims the benefit of U.S. Provisional application Ser. No. 60/351,526 filed Jan. 24, 2002, "Automated Monitoring and Remediation System for Volatile Subsurface Contaminants", by Clifford K. Ho, which is incorporated herein by reference. This application is related to co-pending application by Clifford K. Ho, "Automated Monitoring and Remediation System for Volatile Subsurface Contaminants Using In-Situ Sensors". This application is also related to co-pending application by Clifford K. Ho, "Portable Vapor Diffusion Coefficient Meter".

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

This invention relates generally to the field of subsurface environmental monitoring of contaminated sites, and more specifically to the use of microsensors for in-situ real-time detection, long-term monitoring, and automated remediation of volatile contaminants (VCs), including volatile organic compounds (VOCs), in contaminated soil, aquifers, bodies of water, inside of monitoring wells, and around underground storage tanks or underground pipes, and to methods of characterizing subsurface volatile contaminants using in-situ sensors.

Volatile organic compounds (VOCs), also known as Non-Aqueous Phase Liquids (NAPLs), are the principal contaminants at many commercial and DOE sites. Some examples of VOCs include compounds such as aromatic hydrocarbons (e.g., benzene, toluene, xylenes); halogenated/chlorinated hydrocarbons (e.g., trichloroethylene (TCE), carbon tetrachloride); alcohols, ketones (e.g., acetone) and aliphatic hydrocarbons (e.g., hexane, octane). Other VCs of interest to groundwater protection include methyl tert-butyl ether (MTBE), other gasoline additives, toluene, and xylene (See 40 CFR 141.32 *Primary Drinking Water Standards*). Volatile contaminants can also include toxic chemicals, volatile pesticides, volatile fertilizers, buried volatile explosives, and organic compounds with low volatility. VC's can include gases or vapors other than volatile organic compounds, such as nitrogen oxide, nitrous oxide, carbon monoxide, carbon dioxide, hydrogen gas, and toxic gases, such as ammonia, chlorine, phosphonates, nerve gas (mustard, sarin, VX).

Tens of thousands of sites containing toxic chemical spills, leaking underground storage tanks, and chemical waste dumps require characterization and long-term monitoring (stewardship) to protect environmental resources (e.g., groundwater) and to determine when remedial measures are needed. Current methods are costly and time-intensive, and limitations in sampling and analytical techniques exist. For example, the Department of Energy (DOE) Savannah River Site requires manual collection of nearly 40,000 groundwater samples per year, which can cost between $100 to $1,000 per sample for off-site analysis (not including the cost of collecting the samples). Numerous commercial sites and applications, which include over two million underground storage tanks (e.g., at gas stations), also require monitoring to satisfy EPA requirements; as well as thousands of commercially contaminated sites that require characterization, monitoring, and/or remediation. Also, oil and natural gas fields currently take individual fluid samples manually from wells at a cost of nearly $250,000 per sample.

Another problem with current techniques is that the integrity of off-site analyses of contaminated samples can be compromised during sample collection, transport, and storage. The volatile compounds (VCs) may evaporate if the samples are exposed to the atmosphere when they are handled or stored. Measured concentrations using these ex-situ analysis methods can therefore be lower than actual in-situ concentrations.

The use of real-time sensors that can be placed in-situ would reduce the need for collecting manual samples and performing expensive off-site analyses. However, while technology exists to detect and analyze VOCs, very few systems are rugged enough to be deployed in-situ (e.g., in soil and water) while providing real-time, continuous, and reliable long-term monitoring. Many of these devices include sensitive electronic components (which can be damaged by lightening-induced ground currents) and require the flow of an inert carrier gas during operation (i.e., to carry the contaminant vapor up to a chemical analysis unit located on the surface), which may not be amenable to long-term in-situ monitoring and remediation applications.

Petrovend, Inc., of Hodgkins, Ill. (www.petrovend.com) manufactures a hydrocarbon vapor sensor probe that consists of a single chemiresistor sensor element (ADSISTOR™) mounted in a housing that has multiple openings through which vapors can freely flow. The probe's housing is not waterproof and, hence, cannot be placed in liquid-saturated soil, water, or other liquids contaminated with VOCs.

Geoprobe Systems, Inc. of Salina, Kans. (www.geoprobe-systems.com) manufactures a sampling device called a Geoprobe Membrane Interface Probe, is a cone penetrometer that has a gas permeable membrane covering an opening in the pointed tip (i.e., cone). The membrane selectively allows VOC gases in soil to diffuse through the membrane into the interior of the penetrometer. A gas supply & return tube located inside the penetrometer interfaces with the gas permeable membrane. A carrier gas is pumped through this tube to sweep up and carry VOCs (that have diffused through the membrane) up to a detector/analysis unit located on the surface. The Geoprobe Membrane Interface Probe performs in-situ sampling by pumping and/or drawing the diffused VOC vapor up to the surface via a carrier gas. However, the Geoprobe Membrane Interface Probe does not perform in-situ sensing or analysis, because sensing is performed by a remote detector/analysis unit located on the surface.

Many microsensor systems, such as portable hand-held spectrometers, gas chromatographs, catalytic bead sensors, and metal-oxide-semiconductor (MOS) sensors, utilize complex and sensitive electronic components, can use high temperature elements, and can require the flow of a carrier gas during operation to draw subsurface vapors up to the surface and into a chamber for sensing, none of which may be amenable to long-term in-situ monitoring applications. For example, the "Cyranose" hand-held electronic nose manufactured by Cyrano Sciences, Inc. (www.cyranosciences.com) is a chemiresistor-based microsensor that uses a pump to draw vapors into a sensing chamber. The Cyranose sensor unit, however, cannot be submerged in water for in-situ monitoring because the housing is not waterproof.

Polymer-based vapor absorbtion type sensors are attractive choices for use in VC monitoring devices. Examples of these sensors include conductometric sensors such as chemiresistors, surface or thickness-shear mode acoustic wave (SAW) mass sensors, flexural plate wave mass sensors, and MEMS microcantilever mass sensors. Chemiresistors are a particularly simple type of chemical sensor whose electrical resistance changes in the presence of certain chemical vapors. Chemiresistors are easy to fabricate using well-known semiconductor fabrication techniques, can be made very small (<100 square microns), can operate at ambient temperatures, are passive devices (no pumps or valves are needed), and their resistance change can be read-out by a simple, low power (and low current) circuit that measures DC resistance. This feature allows the use of long electrical cables, which permits the resistance measurement unit and data logging equipment to be remotely located on the surface. Also, chemiresistors are resistant to chemical poisoning (unlike catalytic sensors).

A common type of chemiresistor consists of a chemically sensitive, electrically insulating, organic, soluble polymer matrix that is loaded with a large volume (e.g., 20–40%) of electrically conductive metallic (e.g., gold, silver) or carbon particles to form a polymer-particle composite having a network of continuous electrically conductive pathways throughout the polymer matrix (i.e., host). To fabricate a chemiresistor, the polymer is mixed with a solvent (e.g., water, chlorobenzene, or chloroform) and sub-micron diameter carbon, silver, or gold particles (e.g., 20–30 nanometers) to make an "ink". Then, the resulting ink is deposited onto an insulating substrate as a thin film bridging across two (or more) spaced-apart thin-film electrodes, and then dried. A non-ionic surfactant can also be added to this mixture to chemically bond to the electrically conducting particles and thereby form steric barriers to prevent undesirable aggregation or agglomeration of these particles.

When chemical vapors of solvents, toxic chemicals, explosives, or VOCs come into contact with the polymer-particle composite, the polymer matrix absorbs the vapor(s) and swells. The swelling spreads apart the conductive particles, breaking some of the conductive pathways. This increases the electrical resistance across the two (or more) electrodes by an amount that is easily measured and recorded. The amount of swelling in steady-state, and, hence, the steady-state resistance change, is uniquely related to the concentration of the chemical vapor(s) in equilibrium with the chemiresistor. The resistance response is generally linear with increasing vapor concentration, but can become non-linear at high solvent concentrations when the percolation threshold of the polymer-particle composite is reached. The swelling process is generally reversible; hence the polymer matrix will shrink when the source of chemical vapor is removed (although some hysteresis can occur).

Chemiresistors generally should not be placed in direct contact with liquid VOCs because the polymer can be partially or completely dissolved by the liquid VOC, which may ruin the chemiresistor. Also, it is undesirable to have liquid water in contact with any electrical traces, leads or conductors used in the chemiresistor sensor, because of the potential for problems with short-circuiting and corrosion. Also, direct contact with water can cause the thin-film chemiresistor to detach from the substrate over time. Therefore, for in-situ monitoring of VOCs (e.g., in a well or in water-bearing soil), a waterproof, gas permeable membrane is used to prevent liquid water or liquid VOCs from directly contacting the chemiresistors or exposed electronic components.

The polymer matrix used in chemiresistors generally absorbs multiple solvents having similar solubility parameters. See M. P. Eastman, R. C. Hughes, W. G. Yelton, A. J. Ricco., S. V. Patel and M. W. Jenkins, "Application of the Solubility Parameter Concept to the Design of Chemiresistor Arrays," *Journal of the Electrochemical Society*, Vol. 146, pp. 3907–3913, 1999. Since it is unlikely that any one specific polymer will be sensitive to only one particular VOC, an array of multiple chemiresistors containing a variety of polymer hosts is generally needed to provide accurate discrimination among multiple, interfering vapors (including water vapor).

Multiple chemiresistors have been fabricated side-by-side on a common substrate, such as a silicon wafer, where each chemiresistor has a different polymer matrix selected for high sensitivity to a particular VOC of interest. (See R. C. Hughes, et al., "Integrated Chemiresistor Array for Small Sensor Platforms," SPIE Proceedings, *Detection and Remediation Technologies for Mines and Minelike Targets V*, Vol 4038-62, pp. 519–529, Apr. 24–28, 2000). The more unknown VOCs there are, the greater the number of different polymers are needed to provide adequate discrimination. Hence, a fast and accurate identification technique is needed that can distinguish between multiple types of solvents (polar and non-polar), for both pure compounds and mixtures, over a wide range of concentrations, and in the presence of water vapor.

A common and obvious source of interfering vapors is water vapor (i.e., relative humidity) in the ambient environment. Water vapor affects the relative sensitivity of certain polymers to solvent vapors, and affects the patterns of responses obtained from arrays containing those polymers. To build a chemiresistor array that is capable of identifying the maximum number of possible analytes, the chemiresistors should be as chemically varied as possible, with at least one chemiresistor having significant sensitivity to water vapor.

Arrays of multiple chemiresistors have been successfully used to detect a wide variety of VOCs, including aromatic hydrocarbons (e.g., benzene), chlorinated solvents (e.g., trichloroethylene (TCE), carbon tetrachloride, aliphatic hydrocarbons (e.g., hexane, iso-octane), alcohols, and ketones (e.g., acetone)). See S. V. Patel, M. W. Jenkins, R. C. Hughes, W. G. Yelton, and A. J. Ricco., "Differentiation of Chemical Components in a Binary Solvent Vapor Mixture Using Carbon/Polymer Composite-Based Chemiresistors," *Analytical Chemistry*, Vol. 72, pp. 1532–1542, 2000.

Use of selective gas separation membranes can reduce the maximum number of different chemiresistors in an array since a VOC of particular interest can be selectively passed through the exterior wall of the package housing the chemiresistor array, while excluding other VOCs of lesser interest (e.g. via a selectively permeable membrane). For example, it would be useful to selectively pass chlorinated aliphatic hydrocarbons, but not aromatic hydrocarbons, through the sensor's enclosure.

To miniaturize the electronics that control and drive the chemiresistor arrays Application Specific Integrated Circuits (ASIC) can be integrated with the chemiresistors on a common substrate. The ASIC can perform a variety of functions, including measuring electrical resistance, conditioning data, sensing temperature, and controlling heater elements. (See R. C. Hughes, et al., "Integrated Chemiresistor Array for Small Sensor Platforms," SPIE *Proceedings, Detection and Remediation Technologies for Mines and Minelike Targets V*, Vol 4038-62, pp. 519–529, Apr. 24–28, 2000).

Chemiresistor arrays have also been integrated with a thin-film gas preconcentrator module located side-by-side on a common substrate (or facing each other in close proximity). See R. C. Hughes, S. V. Patel, and R. P. Manginell, "A MEMS Based Hybrid Preconcentrator/Chemiresistor Chemical Sensor," Paper presented at the $198^{th}$ Meeting of The Electrochemical Society, Phoenix, Ariz., Oct. 22–27, 2000. See also R. C. Hughes, R. P. Manginell, and R. Kottenstette, "Chemical Sensing with an Integrated Preconcentrator/Chemiresistor Array," Proceedings of Symposium on Chemical and Biological Sensors and Analytical Methods II, Meeting of The Electrochemical Society, San Francisco, Calif., Sep. 2–7, 2001.

The preconcentrator module works by slowly adsorbing VOC vapors into a thin layer of sorbtive material (i.e., "phase") over a sustained period of time, and then quickly releasing a concentrated puff of the VOC gas by rapidly heating the sorbent using an underlying resistance heater element. The adjacent chemiresistor array is then exposed to a highly concentrated amount of the VOC, which effectively improves the limit of detection of VOCs by factors of 10–1000 times (e.g., from ppm to ppb).

Data analysis techniques for analyzing the resistance response of chemiresistor sensors (or other microchemical sensors) can use the method of Principal Components Analysis (PCA) to identify statistical trends that can distinguish individual VOCs (See, e.g., Lewis and Freund, Sensor Arrays for Detecting Analytes in Fluids, U.S. Pat. No. 5,951,846). However, at high vapor concentrations PCA methods cannot generally be used because the chemiresistor's response becomes non-linear when the percolation threshold is approached.

The non-linear response, however, can be analyzed using pattern recognition techniques (in addition to linear responses). These techniques work by using neural network methods or by comparing the resulting chemical signatures with calibration (i.e., training) sets using advanced pattern recognition software, such as the Visual Empirical Region of Influence (VERI) technique. See G. C. Osbourn, et al., "Visual-Empirical Region-of-Influence Pattern Recognition Applied to Chemical Microsensor Array Selection and Chemical Analysis," *Acc. Chem. Res. Vol.* 31, pp. 297–305, 1998. See also U.S. Pat. No. 6,304,675 to Osbourn, et al., "Visual Cluster Analysis and Pattern Recognition Methods". The "VERI" pattern recognition algorithm performs a similar operation to human vision by analyzing the clustering of the unknown data points with training data from known VOCs.

A desirable aspect of in-situ monitoring is having the capability to not only detect the presence of contaminants, but to also characterize the contaminant in terms of its composition and location of its source. Traditional monitoring techniques require that the monitoring device be in the immediate vicinity of the contaminant to accurately detect and identify the contaminant location. Hence, a need exists for a characterization method that can identify the source's location using one or more in-situ sensors that are located relatively far away from the source.

Current remediation methods use soil vapor extraction (SVE) techniques in the vadose zone (using a vacuum pump to pull vapors out of an extraction (i.e., exhaust) well, or directly coupled to the surface of a shallow spill) and/or air sparging techniques in the saturated zone (pumping air down into a well to below the liquid level to force (i.e., advect) the flow of contaminant vapors through porous soil in the vadose zone towards an exhaust (i.e., exit) well or other opening). These traditional methods rely on the collection of manual samples of the effluent concentration to determine when the site is sufficiently clean. However, heterogeneities in the subsurface can cause rapid decreases in the effluent concentrations caused by mass-transfer limitations, which can be misinterpreted as a "clean" site by a sensor located at the extraction point. The use of an in-situ sensor could not only provide insight into these processes, but it could also be used by automatic feedback systems to turn the pumps on and off when needed, to save money when operating the remediation system.

Existing sensor technologies have not been combined with advanced characterization and automated optimization methods capable of identifying source locations and controlling remediation operations. Single element sensors such as the Adsistor™ are intended to act as an alarm only. Traditional (manual) sampling methods, which are costly and time-consuming, must be subsequently implemented to confirm the veracity of the initial detection and to characterize the contaminant.

A need remains, therefore, for a robust, cost-effective, real-time in-situ microsensor system that can be used for long-term stewardship, and for monitoring subsurface volatile contaminants during remedial operations, such as soil vapor extraction (SVE), air sparging, and bioremediation. Additionally, such a system should also be able to automatically control active components of the remedial system (e.g., air-sparging pumps, vacuum pumps, values, etc.) based on measured in-situ concentrations in order to optimize system performance. A need also exists for wireless communication means that transmit the measured in-situ concentrations (possibly authenticated and encrypted) from a data logger connected to the in-situ sensor to a remote computer for real-time monitoring. Information can also be posted to a Web site for instant dissemination to authorized individuals anywhere in the world.

The ability to perform in-situ diagnostic measurements can save enormous costs associated with traditional manual sampling methods that require off-site analysis. In addition, remediation costs can be reduced by optimally operating components of the remediation system only when needed. Finally, the ability to efficiently conduct remedial measures in real-time (as needed) can improve public confidence in the ability of federal, state, and local governmental agencies to protect the environment and prevent contaminant migration away from these contaminated sites.

Against this background, the present invention was developed.

SUMMARY OF THE INVENTION

An inverse analysis method for characterizing diffusion of vapor from an underground source of volatile contaminant using data taken by an in-situ sensor. The method uses one-dimensional solutions to the diffusion equation in Cartesion, cylindrical, or spherical coordinates for isotropic and homogenous media. If the effective vapor diffusion coefficient is known, then the distance from the source to the in-situ sensor can be estimated by comparing the shape of the predicted time-dependent vapor concentration response curve to the measured response curve. Alternatively, if the source distance is known, then the effective vapor diffusion coefficient can be estimated using the same inverse analysis method. A triangulation technique can be used with multiple sensors to locate the source in two or three dimensions. The in-situ sensor can contain one or more chemiresistor elements housed in a waterproof enclosure with a gas permeable membrane.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
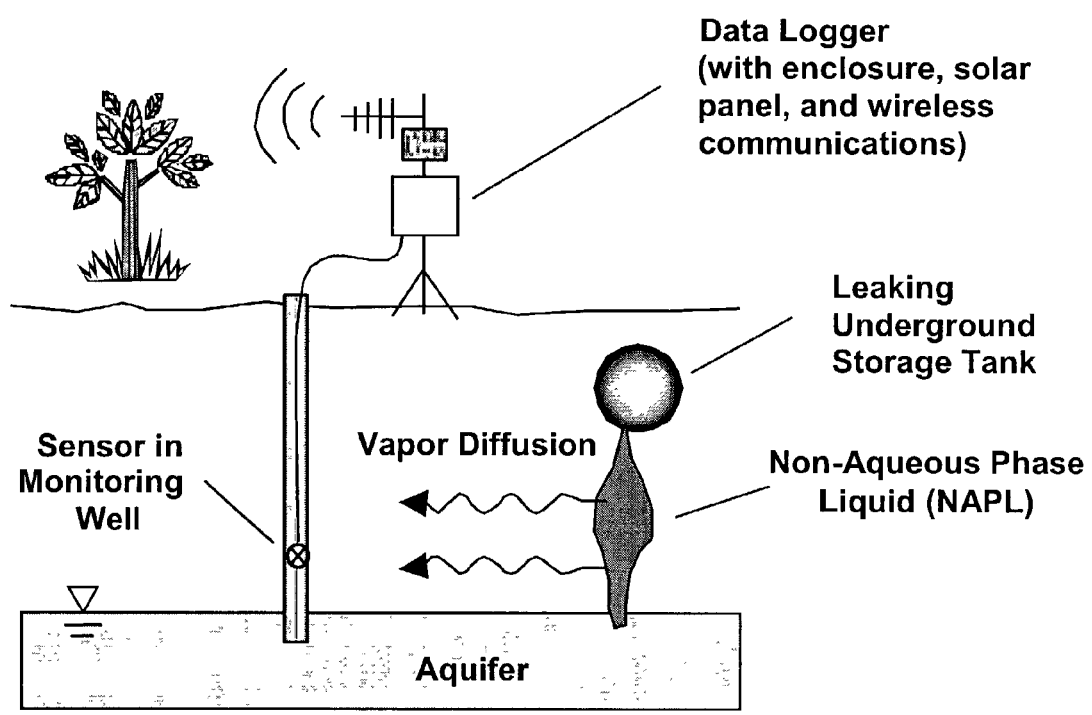
FIG. 1 shows a schematic cross-section elevation view of an in-situ sensor connected to a data logger with solar panel and wireless communications for monitoring vapors from a volatile contaminant leaking from an underground storage tank, according to the present invention.

The present invention relates to an integrated system for performing in-situ monitoring, characterization, and automated, remediation of subsurface volatile contaminants in an optimal and cost-effective way. The present invention also relates to an in-situ, real-time waterproof in-situ microsensor that detects and quantitatively characterizes volatile organic and inorganic compounds in soil, wells, or groundwater. The words "vapor" and "gas" are used interchangeably herein. Similarly, the acronym VOC, which stands for Volatile Organic Compound, is intended herein to also encompass all inorganic volatile compounds (VCs) and other solvents, such as toxic chemicals, explosives, organic compounds having low volatility, and toxic gases.

The terms "in-situ sensor" and "in-situ microsensor" are equivalent, and refer to any robust, rugged, and reliable chemical sensing device that can be emplaced subsurface (e.g., in a well or in direct contact with soil) and can measure in real-time concentrations of vapors of volatile compounds. One embodiment of the in-situ sensor is a compact (1–2") waterproof, gas permeable device that can be emplaced underground in soil, clay, sand, water, saltwater, other liquids, soil/liquid mixtures, etc. Henry's Law can be used to calculate the concentration of liquid contaminants based on the measured vapor concentrations, as is well known in the art.

The in-situ sensor can be emplaced (1) inside of a well hole (and below the liquid level, if waterproof); (2) inside of a cone penetrometer or Geoprobe®; or (3) buried directly underground.

The in-situ sensor can comprise a chromatographic, spectrographic, electrochemical, mass, or optical sensor. The in-situ sensor can be an ion mobility spectrometer (IMS) sensor, a catalytic bead sensor, a metal-oxide semiconductor sensor, a potentiometric sensor, an amperometric sensor, an acoustic wave sensor (e.g., a SAW sensor), a MEMS microcantilever sensor, a fiber optic sensor, a colorimetric sensor, and an infrared sensor (see Ho, C. K.; Itamura, M. T.; Kelley, M.; and Hughes, R. C. Review of Chemical Sensors for In-Situ Monitoring of Volatile Contaminants, *Sandia Report* 2001, SAND2001-0643, Sandia National Laboratories, Albuquerque, N. Mex., which is incorporated herein by reference).

An example of an in-situ microsensor is described in related US Patent application, application Ser. No. 10/152,597 filed May 15, 2002, "Waterproof Microsensor for In-Situ Monitoring of Volatile Compounds", by Clifford K. Ho, et al., which is incorporated herein by reference. This in-situ chemical sensor can comprise a compact, rugged, waterproof housing (e.g., dimensions of 1–2 inches), with a gas-permeable membrane (such as GoreTex™) that contains one or more chemiresistor sensing elements that are sensitive to very low concentrations of VOC's (ppm's). The microsensor can include on-board heating elements to control the chemiresistors temperature, and can also include a pre-concentrator element to increase its sensitivity. Custom on-board ASIC circuits can be used to perform resistance calculations, condition data, measure temperatures, and control heater elements. This type of in-situ microsensor can have a response time scale on the order of seconds, which effectively is "real-time" compared to the typical time scale (hours/days/months) for subsurface diffusion of volatile contaminants.

Contaminant Source Characterization

According to the present invention, estimations of the source location of a contaminant spill or leak can utilize in-situ real-time monitoring to exploit the transient nature of contaminant transport in the subsurface. Time-dependent vapor concentrations recorded by the in-situ sensor can be used to estimate the location of the contaminant release through comparisons with theoretical predictions of contaminant transport in porous media. Diffusion of the contaminant vapor from the source region to the in-situ (e.g., chemiresistor) sensor produces a time-dependent "breakthrough" curve. The shape of the breakthrough curve can be analyzed to estimate the distance to the source term, the effective vapor diffusion coefficient, and/or the gas-phase permeability of the porous media.

An illustration of the conceptual model describing the scenario of a subsurface contaminant leak is shown in FIG.

1. We assume that mass transfer can occur through the subsurface (in the unsaturated zone) by vapor diffusion between the leaking non-aqueous-phase liquid (NAPL) and the surrounding "clean" environment. While it is unlikely that the location of the in-situ sensor will actually intercept the liquid-phase NAPL itself, volatile vapors from the NAPL can diffuse outwards to the sensor's location. The transient vapor concentration measured at the sensor location yields a breakthrough response curve that has a shape defined by both the distance between the NAPL and the sensor, and by the effective vapor diffusion coefficient. The following mathematical model describes the diffusive mass transfer of vapor in porous media, and the determination of the vapor-concentration breakthrough curve at the sensor location. For illustration, a one-dimensional Cartesian model is considered, wherein the vapor source is a sheet/planar source. One-dimensional radial solutions can also be developed for radially-symmetric line-sources and; as well as one-dimensional spherical solutions for point-sources. For the solutions presented below, the porous media is assumed to be isotropic and homogenous; as represented by an effective (e.g., averaged) vapor diffusion coefficient. However, the impact of, multi-dimensional diffusion caused by heterogeneities and variable liquid saturation can be considered in future models.

A mass balance yields the following governing differential equation for one-dimensional vapor diffusion in a porous medium:

$$\frac{\partial C}{\partial t} = D \frac{\partial^2 C}{\partial x^2} \quad (1)$$

where C is vapor concentration [kg/m³], D is the effective vapor diffusion coefficient in porous media [m²/s], t is the time [s], and x is the distance [m] from the source (e.g., NAPL). The initial and boundary conditions that are used in the following experiments are:

$$C(x, t=0) = C_i \quad (2)$$

$$C(x=0, t) = C_s \quad (3)$$

$$\frac{\partial C(x=L, t)}{\partial x} = 0 \quad (4)$$

where $C_i$ is the initial vapor concentration in the domain, $C_s$ is the vapor concentration at the source, and L is the distance between the source and the sensor. The concentration, C, can be normalized as C' between 0 and 1 as follows:

$$C'(x, t) = \frac{C(x, t) - C_i}{C_s - C_i} \quad (5)$$

The one-dimensional solution for the normalized vapor concentration evaluated at the sensor location (x=L) can be expressed as follows:

$$C' = 1 - \frac{4}{\pi} \sum_{n=0}^{\infty} \frac{(-1)^n}{2n+1} \exp\left(-\frac{D(2n+1)^2 \pi^2 t}{4L^2}\right) \quad (6)$$

It should be noted that the boundary condition in Eq. (4) is specific to the experimental conditions described in the next section. In actual field conditions, the applicable boundary condition is a vapor concentration of zero (or the initial condition) as x approaches infinity, which yields the following normalized one-dimensional Cartesian solution that can be employed in a similar manner as Eq. (6):

$$C' = \mathrm{erfc}\left(\frac{L}{2\sqrt{Dt}}\right) \quad (7)$$

Other one-dimensional analytical solutions for cylindrical and spherical coordinate systems can be found in Carslaw, H. S. and J. C. Jaeger, 1959, *Conduction of Heat in Solids*, $2^{nd}$ Ed. Oxford University Press, Oxford. The solution procedure described above for the 1-D Cartesian system can be applied generally to other coordinate systems as well.

The normalized time-dependent concentration in Eq. (6) can be plotted as a function of time to yield a vapor-concentration breakthrough response curve that has a shape defined by the effective diffusion coefficient, D, and the distance between the sensor and the contaminant source, L. If the effective diffusion coefficient is known, or has been estimated, then obtaining a good fit between the theoretical results of Eq. (6) and the observed data can yield an inverse estimation of the source distance, L. On the other hand, if the separation distance is known, then the effective diffusion coefficient can be inversely determined, in a similar manner, i.e., by comparing the predicted and observed data.

The effective diffusion coefficient, D, can be calculated as follows (see Millington, R. J. Gas Diffusion in Porous Media. *Science* 1959, 130, pp. 100–102.), which is incorporated herein by reference:

$$D = \phi_a^{4/3} \left(\frac{\phi_a}{\phi_t}\right)^2 D^o = (1 - S_l)^{10/3} \phi_t^{4/3} D^o \quad (8)$$

where $\phi_a$ is the air-filled porosity, $\phi_t$ is the total porosity, $S_l$ is the liquid saturation, and $D^o$ is the binary gas-phase diffusion coefficient in air given in Fuller, E. N.; Schettler, P. D. and Giddings, J. C., "A Comparison of Methods for Predicting Gaseous Diffusion Coefficients," *J. Gas Chromatography* 1965, pp. 222–227, which is incorporated herein by reference. This equation estimates the effective diffusion coefficient in a partially saturated porous media with no retardation caused by partitioning of the vapor onto the solid phase. The effective diffusion coefficient is generally less than the binary diffusion coefficient in air because of obstructions caused by liquid and solid phases that increase the tortuosity and reduce the available area for diffusion.

Other formulas can be used for calculating the effective vapor diffusion coefficient, D, for a porous media with consideration of increased tortuosity, reduced area caused by the porous media, and possible retardation caused by partitioning of the vapor onto the solid phase.

EXAMPLE OF CHARACTERIZING VOLATILE CONTAMINANTS USING AN IN-SITU SENSOR

Figure 2:
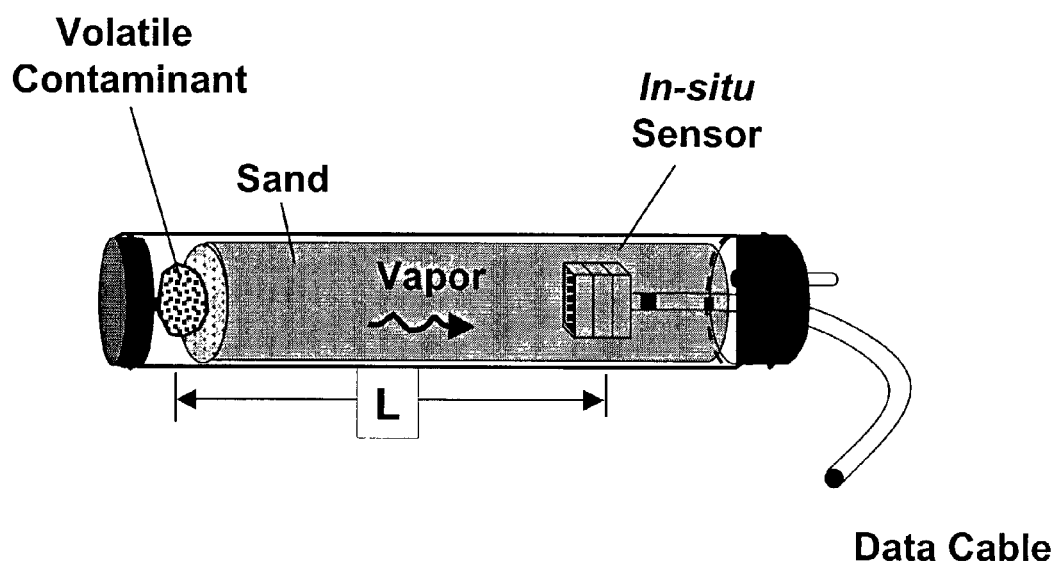
FIG. 2 shows a cutaway view of a 1-D column experiment using sand in a glass tube with a source of volatile contaminant located at one end and an in-situ sensor located at the other, according to the present invention.

One-dimensional column experiments were performed to test the sensors in simulated geologic environments and to demonstrate the source characterization method derived above. The experiment consisted of a sand-filled glass (borosilicate) column sealed by an in-situ chemiresistor sensor at one end of the column and a contaminant source term (saturated iso-octane) at the other end (see FIG. 2). The sand used in the experiments was dry and sorted using 10–20 mesh sieves. The sensor package was fit into a custom-made adaptor that provided an air-tight seal between the sensor package and the 5-cm diameter tube. The NAPL contaminant was placed into a piston-like reservoir that also provided an air-tight seal at the other end of the tube. Small amounts of iso-octane (several milliliters), sufficient to saturate the column with iso-octane vapor, was introduced into the reservoir via soaked cotton balls. A steel mesh covering the cotton balls in the reservoir prevented direct contact between the sand and the liquid iso-octane.

The in-situ chemiresistor sensor was connected by cable to an Agilent 34970A data logger, which was connected to a Dell Optiplex PC. After the contaminant was introduced to the system at time=0, the electrical resistance of the chemiresistor sensor was periodically recorded to monitor the diffusion of iso-octane vapors from the reservoir to the sensor. As derived in the previous section, the sand provides additional resistance to mass diffusion, and the "breakthrough curve" has a diffusive shape dependent on the separation distance between the sensor and contaminant, as well as the effective diffusion coefficient. Two separate experiments were conducted using separation distances of 20 cm and 36 cm, respectively.

The sensor was calibrated before the experiment to different concentration exposures to iso-octane. The calibration curves were used to convert the measured resistance changes of the chemiresistors to vapor-phase iso-octane concentrations. The concentrations measured by the sensor were then normalized to the maximum concentration, and results were plotted as a function of time and compared to predictions of analytical solutions of diffusion transport.

To use the analytical solution in Eq. 6, the effective diffusion coefficient and separation distance between the sensor and contaminant source term are needed. Eq. 8 provides an expression for the effective diffusion coefficient, where the binary diffusion coefficient for iso-octane at 100 kPa and 22° C. was calculated as $6.5 \times 10^{-6}$ $m^2/s$ (see Fuller, E. N., et al., supra), the liquid saturation was zero, and the sand porosity had an average measured porosity of 0.35.

Experimental Results

Figure 3:
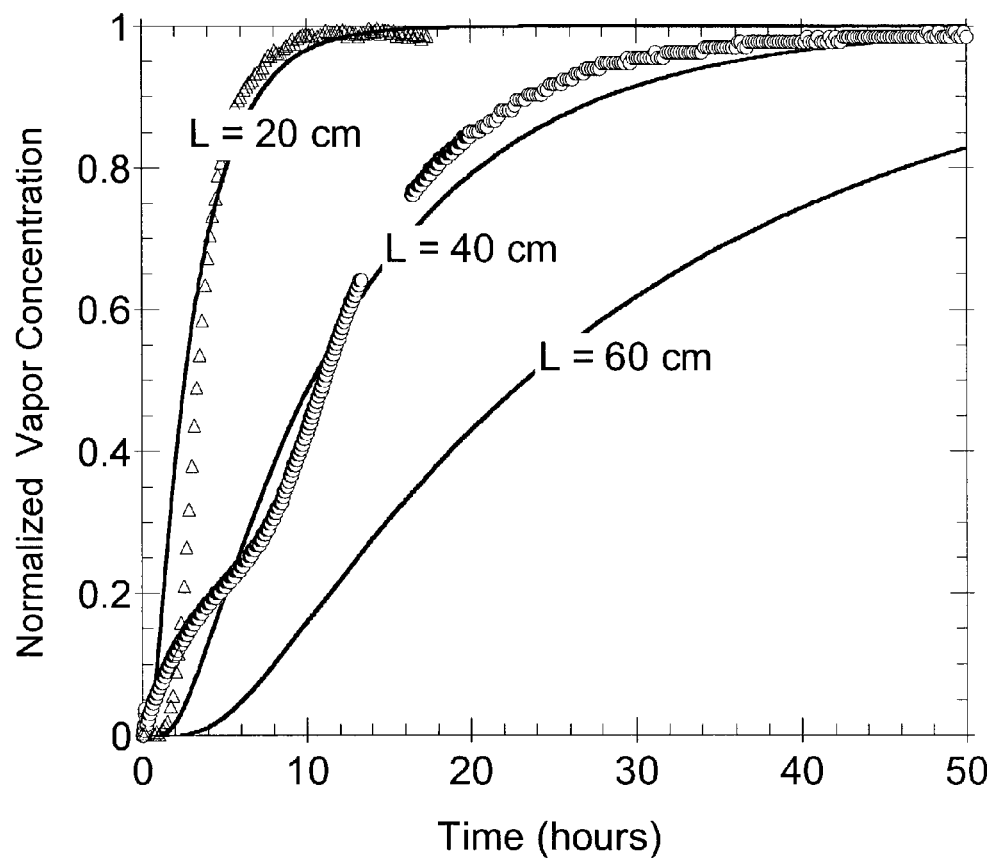
FIG. 3 shows a plot of the normalized vapor concentration as a function of time for the 1-D column experiment; the data points are shown as symbols, and the results of the analytical solution are shown as solid lines for three different assumed distances, according to the present invention.

FIG. 3 shows the experimental results of the one-dimensional column experiments, along with one-dimensional analytical solutions predicted for three different assumed distances (i.e., 20, 40, and 60 cm) to demonstrate how the location of the contaminant can be estimated using an iterative/inverse approach. The data points are shown as symbols, and the predictions from the analytical solution are shown as solid lines for the three assumed distances. Results indicate that the measured time-varying concentrations for the 20 cm experiment align most closely with the predicted results that assumed a distance, L, of 20 cm. Similarly, the measured concentrations for the 36 cm source distance experiment most closely match the predicted results that assumed a distance of 40 cm. Slight deviations in the experimental breakthrough curves may be due to additional factors not considered in the model, such as adsorption of the vapors onto the sand, which would tend to flatten the breakthrough curves. Nevertheless, a simple visual inspection of the experimental and theoretical breakthrough curves is sufficient to estimate the distance to the source-term location with acceptable accuracy. More rigorous statistical methods using regression techniques can be used to better quantify the location based on the analytical predictions.

Figure 4:
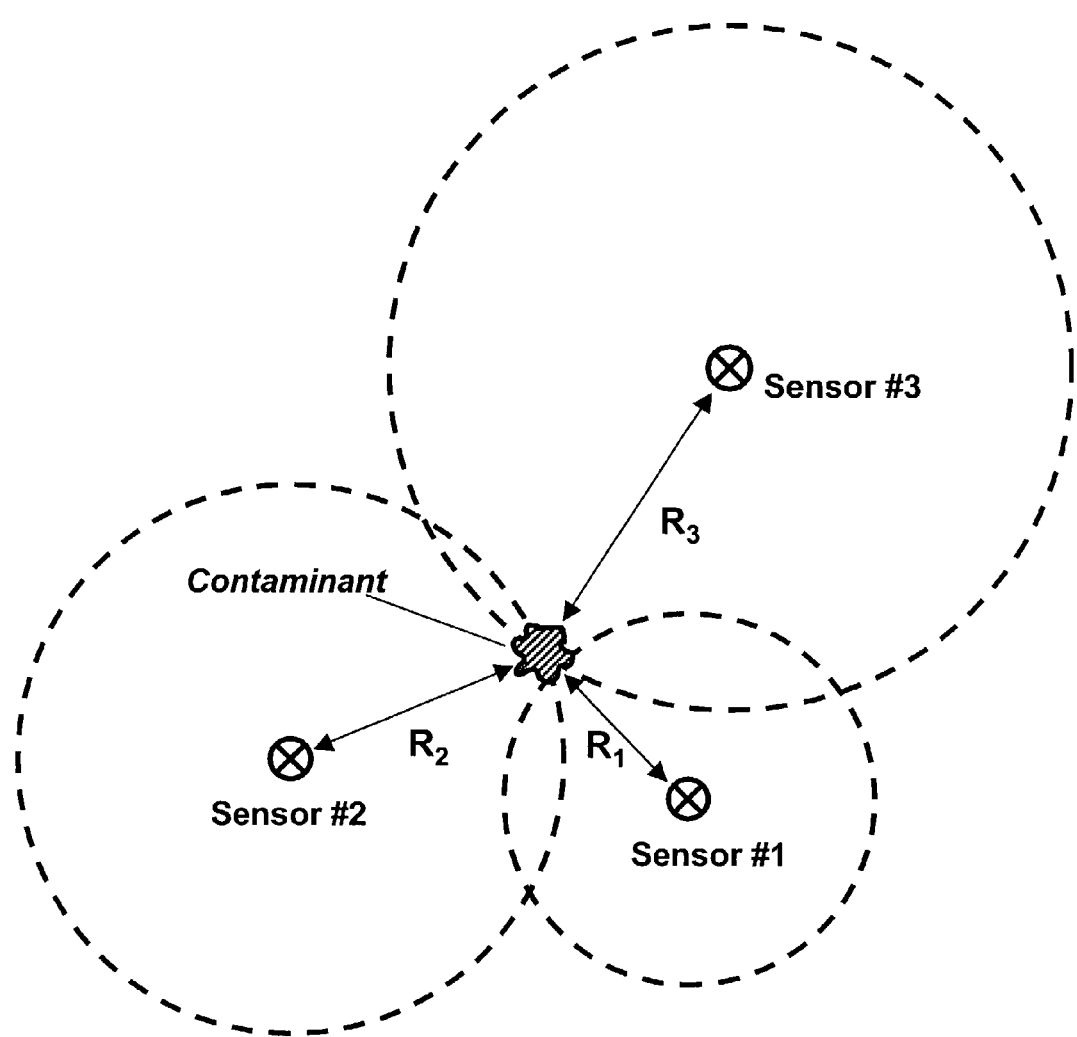
FIG. 4 shows a schematic plan view of an example of three in-situ sensors located at three different radii from a contaminant source, illustrating the technique of using triangulation to locate the position of the contaminant source, according to the present invention.

This one-dimensional analysis can be extended to multidimensional, symmetric flow fields, and to the use of multiple sensors. One-dimensional solutions in 2-D cylindrical/radial coordinates or in 3-D spherical coordinates can yield estimates of radial/spherical distances to the contaminant source using similar methods illustrated in FIG. 3. Circles or spheres can be drawn around the location of each sensor with radii estimated from the sensor data. If more than one sensor exists, the intersection of these circles or spheres provides an estimate of the location of the contaminant in two and three dimensions, respectively. FIG. 4 provides an illustration of this triangulation method in two-dimensions, where we assume that a vertical leak provides a radially-symmetric line source in the plan view. In spherical coordinates, the source would be a point source (not shown). In FIG. 4, three sensors are used to quantify the location of the contaminant. More sensors will provide increased accuracy. As mentioned above, rigorous statistical methods (e.g., least-squares regression analyses) can be used to better quantify the location based on the analytical predictions and the collected sensor data.

If advective processes are also occurring in the subsurface due to barometric pressure fluctuation creating pressure gradients, more complex solutions to the advection-diffusion equation can be used to predict the transient response of the contaminant breakthrough curve at the sensor location.

The advection-dispersion equation can be written as follows, assuming constant porosity, diffusion coefficient, and liquid saturation:

$$\frac{\partial C}{\partial t} = D\nabla^2 C - \nabla \cdot (vC) \qquad (9)$$

where C is the concentration [$kg/m^3$], t is time [s], D is the effective diffusion/dispersion coefficient, and v is the gas velocity vector defined by Darcy's Law. Inverse solutions like those described above can be used to solve Eq. (9) by minimizing the difference between predicted and measured in-situ sensor data.

If the exact time (i.e., the "start" time) at which the leak or spill of volatile contaminant occurs is unknown, the process described above for characterizing one-dimensional vapor diffusion can still be utilized by recognizing that the shape of the time-varying response curve (i.e., the "breakthrough" curve) depends primarily on D and L. Although changes in the start time shift the curve either forwards or backwards in time, the curve's shape does not change. Hence, the assumed start time used for the predicted response curve can be easily adjusted until the shape of the predicted curve best fits the shape of the measured curve.

The inverse analysis method described above can also be used when the vapor concentration rebounds after the operation of a remediation system has reduced the vapor concentration to below a pre-selected threshold level, and the remediation system has been turned off.

Automated Control of Remediation Systems Using In-Situ Sensors

Figure 5:
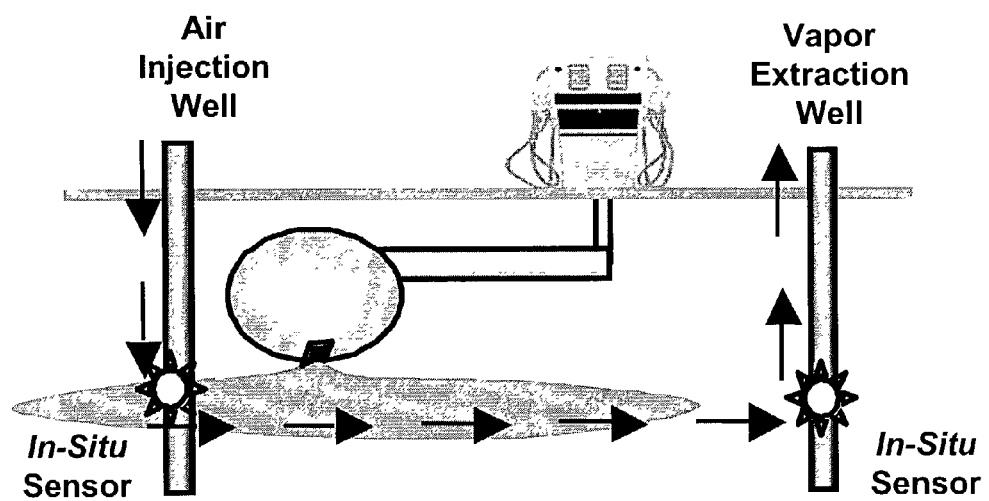
FIG. 5 shows a schematic elevation view of an air sparging system for remediating soil contaminated with a volatile contaminant, being monitored by an in-situ sensor.

In-situ sensors can be used to optimize remediation methods such as soil-vapor extraction in the vadose zone and air sparging in the saturated zone. These methods rely on the flow of advective fluid (e.g., air, oxygen, ozone, air+ozone, or water) to volatilize or dilute and transport or remove the contaminant from the subsurface. This is illustrated schematically in FIG. 5. In the saturated zone, air (for example) is first pumped into the contaminated groundwater ("air sparging") through an air injection well, and then air-plus-advected-vapors are extracted (i.e., vented, exhausted) from the vadose zone through a vapor extraction well. The injection well is generally located on the opposite side of the contaminant source than the extraction well. This active venting process allows vapors from a large region to flow past the sensor, which allows the detection of contaminants much more quickly than when using passive methods.

Figure 6:
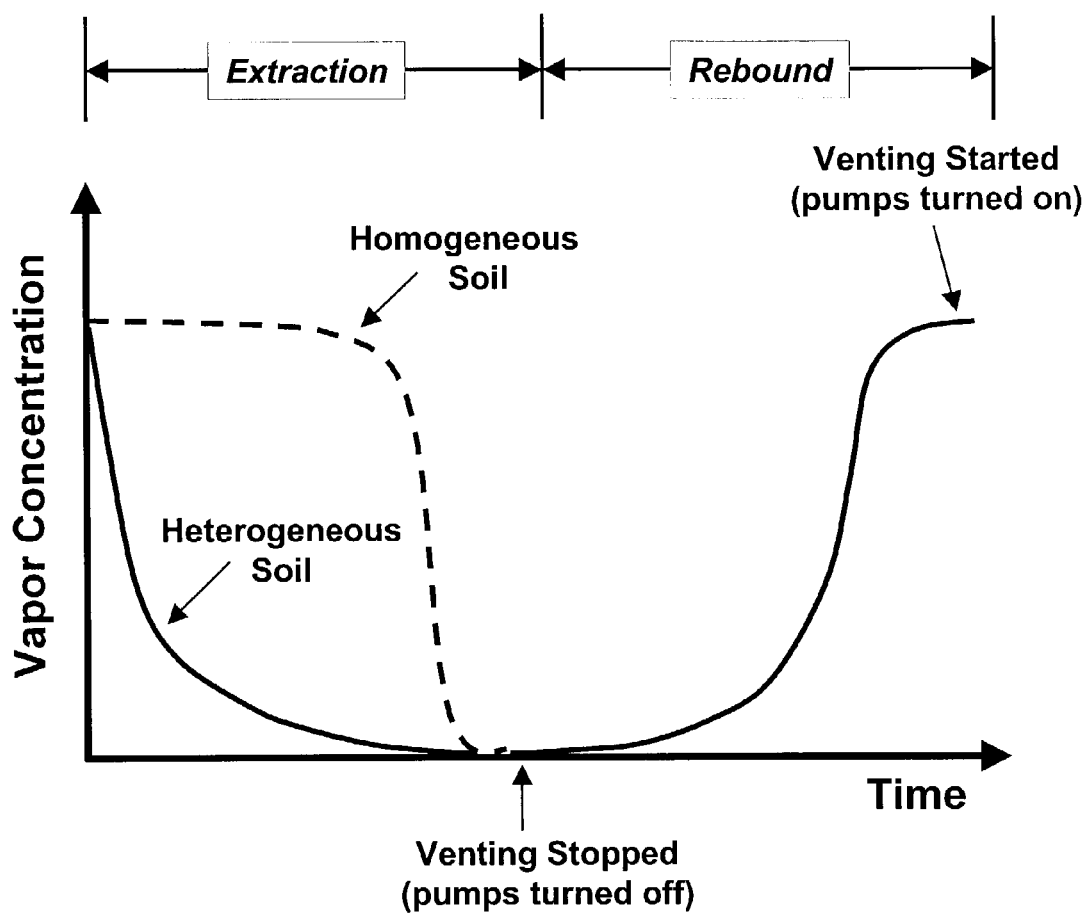
FIG. 6 shows a plot of vapor concentration versus time as measured by an in-situ sensor, illustrating the effect of turning on and off the pump used to vent the vapors from the soil.

Heterogeneities in the structure and porosity of the subsurface can cause mass-transfer limitations when the advective fluid bypasses low-permeability regions of stagnant contamination (i.e., bypass flow), or when the removal rate (e.g., in a high-permeability region) greatly exceeds the rate of diffusion (e.g., in a low-permeability region). An in-situ sensor can be used to determine when the effluent concentrations have dropped to a lower threshold level that is no longer cost-effective or efficient for the system to be operated. This sensor can signal (i.e., trigger) one or more pumps to shut down or reduce power, allowing the vapor concentrations to re-equilibrate as the contaminant diffuses back into the advective zones (see FIG. 6). When the concentration rebounds due to diffusion from stagnant contaminated regions and reaches a "productive" upper threshold level, the in-situ sensor can trigger the pump or pumps to turn on again (or increase power). This method of providing automatic feedback can save money and prolong component lifetime by optimally operating the remediation system only when contaminant concentrations are present at a significant level. This system also optimizes the performance of stripping methods, such as SVE or air sparging, by producing the maximum advective flow of the stripping fluid only when needed.

Figure 7:
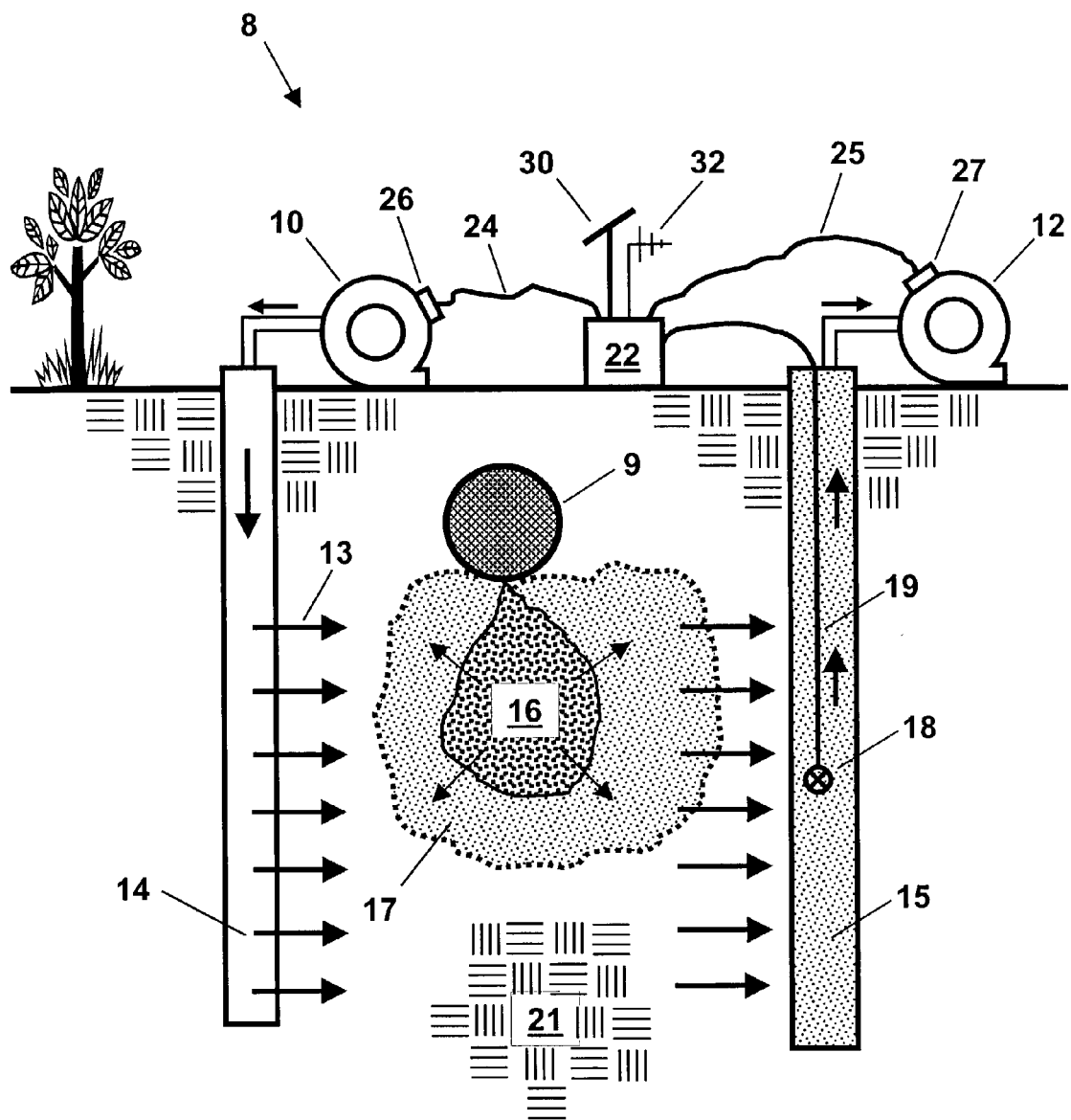
FIG. 7 shows a schematic cross-section elevation view of an example of a system for automatically controlling the remediation process.

FIG. 7 shows a schematic cross-section elevation view of an example of a system for automatically controlling the remediation process, according to the present invention. A non-aqueous phase liquid (NAPL) is leaking from underground storage tank 9, creating a contaminated zone 16 of volatile contaminant. Vapors 17 of the volatile contaminant diffuse outward from contaminated zone 16 through the surrounding porous soil 21. Remediation system 8 can comprise air compressor 10 for injecting air 13 into injection well 14, which is located outside of contaminated zone 16. Compressed air 13 can be injected either into the saturated zone, the un-saturated vadose zone located above, or a combination of both. The compressed air 13 flows through and/or above contaminated zone 16, advecting (entraining) vapors 17 of volatile contaminants, and then exits out though extraction well 15 carrying vapors 17 with it. Vacuum pump 12 can, optionally, be used for increasing the extraction rate of air 13 with advected 17. Alternatively, vacuum pump 12 can be used solely to perform soil vapor extraction (i.e., without using air compressor 10 to inject compressed air 13). In-situ sensor 18 can be located inside of extraction well 15 within the saturated zone (or the un-saturated vadose zone, depending on whether the sensor's housing is waterproof or not). In-situ sensor 18 can also be located outside well 15 directly in the subsurface by using direct-push methods, such as cone penetrometers and Geoprobes®. In-situ sensor 18 can be suspended by data cable 19, which carries sensor data to data logging and processing unit 22 located on the surface.

Data processor 22 converts the raw data from in-situ sensor 18 into vapor concentration levels, and tracks the changes in vapor concentration over time, including tracking the time rate-of-change in the vapor concentration (i.e., slope of the transient response curve) over time. Data processor 22 can be powered by a battery or solar power panel 30. Sensor data and/or pump control commands can be transmitted by antenna 32 (or satellite dish) to a central receiving unit (not shown). Data processor 22 can be programmed so that when the subsurface vapor concentration measured by in-situ sensor 18 (or when the time rate-of-change (slope) of the vapor concentration) is below a pre-selected lower threshold value, a control signal is sent via cable 24 (or by wireless communication means) to compressor pump relay 26 to turn off compressor pump 10 and/or flow control valves (not shown). Alternatively, or additionally, a similar control signal can be sent from data processor 22 via cable 25 (or by wireless communication means) to vacuum pump relay 27 to turn off vacuum pump 12 and/or flow control valves (not shown). Alternatively, data processor 22 can control pumps 10 and/or 12 to operate at variable speeds and powers, rather than simply using an on/off command.

Subsequently, when the vapor concentration (or slope of the concentration response curve) has increased to a level above a pre-selected upper threshold value, data processor 22 can instruct compressor 10 and/or vacuum pump 12 to turn on.

Remediation system 8 can also be operated in a "sentinel" mode, where no active remediation is presently occurring. Here, remediation system 8 would be activated only when the in-situ "sentinal" sensor 18 detects contaminant vapor caused by an unexpected leak or spill at an unknown time. Although the exact time at which the leak occurred would not be precisely known, careful analysis of the early-time vapor concentrations measured by the in-situ sensor can be used to estimate the initial time of leak/spill. Additionally, the assumed "start" time can be adjusted forward or backwards in time until the shape of the predicted response curve best matches the shape of the measured response curve, as discussed earlier.

Figure 8:
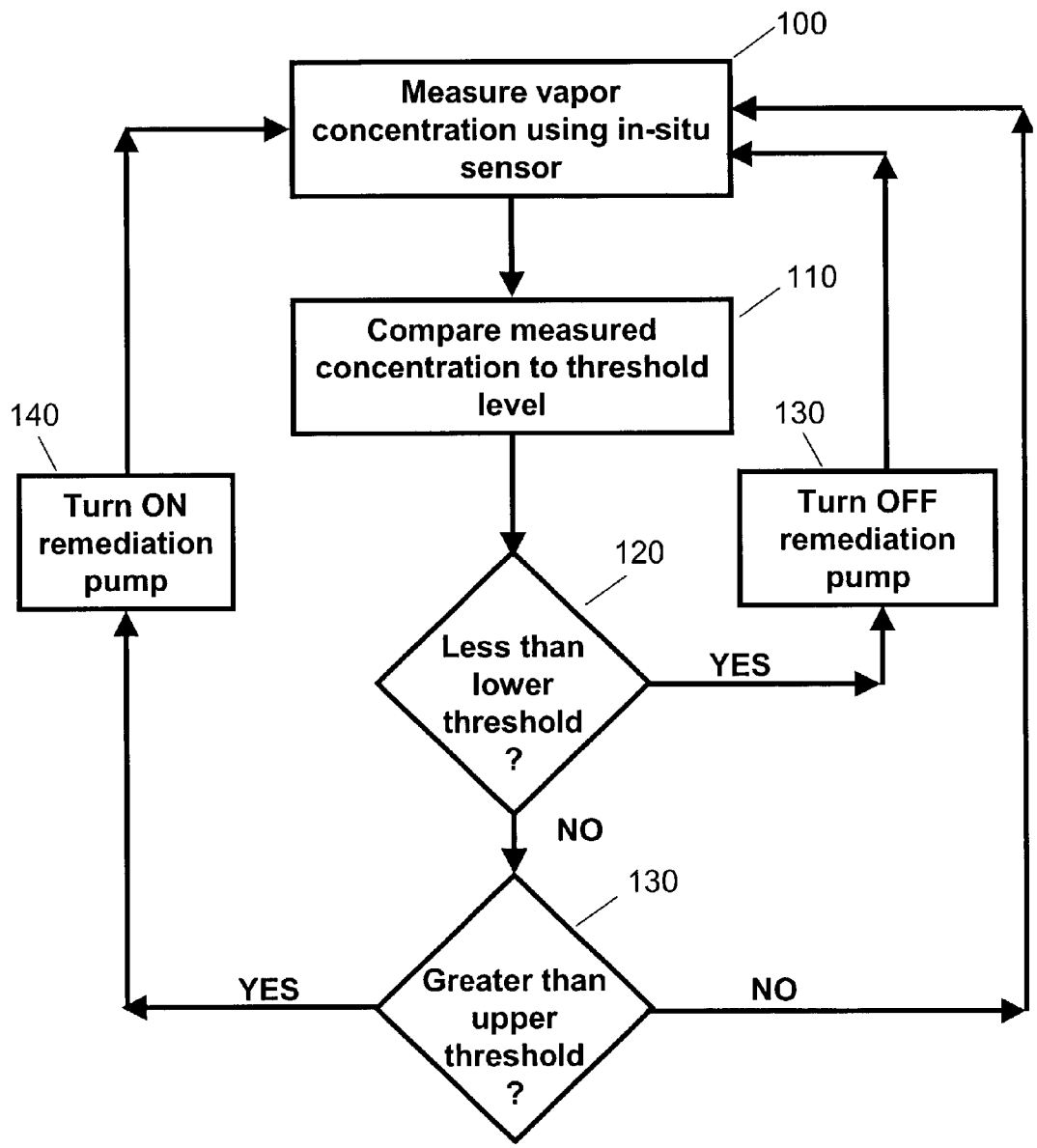
FIG. 8 describes an example of process steps for using an in-situ sensor to control the operation of a remediation system.

FIG. 8 describes an example of process steps for using an in-situ sensor to control the operation of a remediation system using an automated feedback control system. In step 100, the subsurface vapor concentration is measured by an in-situ sensor. Then, in step 110, the measured vapor concentration is compared to high and low pre-selected (i.e., pre-programmed) threshold levels. Then, in step 120, if the measured concentration is less that the lower pre-selected threshold level, a signal is sent to turn OFF the remediation pump in step 130. If the answer is NO in step 120, and if the measured concentration is greater that the higher pre-selected threshold level, a signal is sent to turn ON the remediation pump in step 140. If the measured concentration is in-between the high and low pre-selected threshold levels, then the process loops back to step 100 and begins again.

A person of ordinary skill in the art will appreciate that remediation system 8 can comprise a plurality of in-situ sensors, disposed at multiple heights within a well bore, or disposed at various locations, radii, and heights in the ground outside of the well bore, or combinations of both, but reasonably close to the contaminated zone; as well as an array of pumps at various locations on the surfaces, surrounding the contaminated site. Statistical regression methods can be used to select appropriate values of both the unknown source distance, L, and the unknown effective diffusion coefficient, D, by mathematically minimizing the difference between the predicted and measured response curves of the two or more sensors.

Data logging and processing unit 22 can include a photovoltaic solar panel 30 to supply power, and an antenna 32 (or satellite dish) to wirelessly transmit sensor data to a receiving station, for example, to a PC or workstation for access through the Internet.

After the contaminants in the permeable regions have been purged by air sparging or vacuum extraction and the measured concentrations have decreased to acceptably-low levels, the subsequent rebound of the concentrations (i.e., after turning off the air/vacuum pumps) can be used to characterize either the location of the contaminant plume or the effective diffusion coefficient (or both, depending on the number and placement of in-situ sensors that are used), using the 1-D, 2-D, or 3-D inverse characterization methods described above.

In addition to automatically controlling the operation of the remediation system, the location and extent of the contaminant plume can be estimated by observing the time-dependent concentrations recorded by the in-situ sensors during active venting processes. See C. K., 1998, An Analytical Inverse Model for Multicomponent Soil Vapor Extraction, J. Environmental Engr., special edition on Monitoring Systems for Contaminants in the Subsurface, vol. 124, no. 6, pp. 504–509, which is incorporated herein by reference. See, also, Ho, C. K. and K. S. Udell, 1992, An Experimental Investigation of Air Venting of Volatile Liquid Hydrocarbon Mixtures from Homogeneous and Heterogeneous Porous Media, *J. Contam. Hydrol.*, 11, 291–316, which is incorporated herein by reference. These two references describe an analytical model to determine in-situ compositions and contaminant volumes from effluent gas concentrations during soil vapor extraction processes. The method exploits the chromatographic separation of volatile compounds as air is vented through the contaminated soils. However, rather than sampling effluent concentrations as suggested by Ho (1998), supra, which can be time-consuming and costly, the in-situ sensors can be used to collect the concentration signatures that can be used to augment the characterization of contaminants. This information can also be used to characterize the bulk permeability of the ground around the in-situ sensors, which can provide information about the lithography of a site without having to drill and take core samples. Knowing the bulk permeability is important when predicting the transport of injected gases (such as oxygen, which might be injected to accelerate the rate of biodegradation during bioremediation activities).

The particular examples discussed above are cited to illustrate particular embodiments of the invention. Other applications and embodiments of the apparatus and method of the present invention will become evident to those skilled in the art.

The actual scope of the invention is defined by the claims appended hereto.

What is claimed is:

1. A method of estimating the distance from an underground source of volatile contaminant to an in-situ sensor, comprising:
   a) measuring a time-varying concentration of vapor from an underground source of volatile contaminant using an in-situ sensor located underground;
   b) generating a time-dependent response curve from the measured concentrations;
   c) providing an effective vapor diffusion coefficient, D;
   d) estimating the distance, L, between the in-situ sensor and the contaminant source;
   e) predicting the time-varying concentration C' using the effective vapor diffusion coefficient, D, calculated in step c), and using the estimated distance, L, estimated in step d), by using a one-dimensional analytical solution for diffusion of vapor from a fixed source in an isotropic and homogenous porous media;
   f) generating a time-dependent response curve based from the predicted concentrations;
   g) normalizing both the predicted and measured response curves;
   h) comparing the normalized predicted and measured response curves; and
   i) repeating steps d) through h) as many times as necessary, each time adjusting the estimated distance, L, until the shape of the normalized predicted response curve matches sufficiently well the shape of the normalized measured response curve;
   j) whereby the estimated distance L is finally estimated upon a sufficient match between the normalized predicted response and measured response curves.

2. The method of claim 1, wherein the effective vapor diffusion coefficient, D, is calculated by using the following equation:

$$D = \phi_a^{4/3}\left(\frac{\phi_a}{\phi_t}\right)^2 D^o = (1 - S_l)^{10/3} \phi_t^{4/3} D^o$$

where $\phi_a$ is the air-filled porosity, $\phi_t$ is the total porosity, $S_l$ is the liquid saturation, and $D^o$ is the binary gas-phase diffusion coefficient in air.

3. The method of claim 1, wherein using the one-dimensional analytical solution in step e) comprises using the following equation for a semi-infinite domain:

$$C' = erfc\left(\frac{L}{2\sqrt{Dt}}\right).$$

4. The method of claim 1, wherein using the one-dimensional analytical solution in step e) comprises using a coordinate system selected from the group consisting of Cartesian, cylindrical, and spherical coordinates.

5. The method of claim 1, further comprising using a least-squares regression statistical analysis to estimate the source distance, L.

6. The method of claim 1, further comprising using a triangulation method with at least two in-situ sensors located underground to more accurately determine the source location.

7. The method of claim 1, wherein the in-situ sensor comprises a waterproof housing with a gas permeable membrane.

8. The method of claim 7, wherein the in-situ sensor comprises a chemiresistor sensing element.

9. The method of claim 1, further comprising communicating data from the in-situ sensor to a data logging and processing unit located on the surface.

10. The method of claim 9, further comprising wirelessly transmitting measured and processed data from the data logging and processing unit to a receiving station.

11. The method of claim 1, wherein the in-situ sensor is disposed underground at a position selected from the group consisting of inside of a monitoring well, inside of an extraction well, inside of an injection well, inside of a cone penetrometer, inside of a probe, and buried directly underground.

12. The method of claim 1, wherein the analysis begins after a remediation system has reduced the vapor concentration to below a pre-selected threshold level and the remediation system has been turned off, at which point the vapor concentration rebounds.

13. A method of estimating an effective vapor diffusion coefficient, D, which characterizes the diffusion of a vapor from an underground source of volatile contaminant located at a known distance, L, from an in-sift sensor, comprising:
   a) measuring a time-varying concentration of vapor from an underground source of volatile contaminant using an in-situ sensor located underground at a known distance, L, from the source of volatile contaminant;
   b) generating a time-dependent response curve from the measured concentrations;
   c) estimating the effective vapor diffusion coefficient, D;
   d) predicting the time-varying concentration C' using the estimated effective vapor diffusion coefficient, D, estimated in step c), and using the known distance, L, by using a one-dimensional analytical solution for diffusion of vapor from a fixed source in an isotropic and homogenous porous media;
   e) generating a time-dependent response curve from the predicted concentrations;
   f) normalizing both the predicted and measured response curves;
   g) comparing the normalized predicted and measured response curves; and
   h) repeating steps d) through h) as many times as necessary, each time adjusting the estimated effective vapor diffusion coefficient, D, until the shape of the normalized predicted response curve matches sufficiently well the shape of the normalized measured response curve;
   i) whereby the effective vapor diffusion coefficient, D, is estimated.

14. The method of claim 13, wherein using the one-dimensional analytical solution in step e) comprises using the following equation for a semi-infinite domain:

$$C' = erfc\left(\frac{L}{2\sqrt{Dt}}\right).$$

15. The method of claim 13, wherein using the one-dimensional analytical solution in step e) comprises using a coordinate system selected from the group consisting of Cartesian, cylindrical, and spherical coordinates.

16. The method of claim 13, further comprising using a least-squares regression statistical analysis to estimate the effective vapor diffusion coefficient, D.

17. The method of claim 13, further comprising using at least two in-situ sensors located underground at known positions relative to the source location to more accurately estimate the effective vapor diffusion coefficient, D.

18. The method of claim 13, wherein the in-situ sensor comprises a waterproof housing with a gas permeable membrane.

19. The method of claim 18, wherein the in-situ sensor comprises a chemiresistor sensing element.

20. The method of claim 13, further comprising communicating data from the in-situ sensor to a data logging and processing unit located on the surface.

21. The method of claim 20, further comprising wirelessly transmitting data processed by the data logging and processing unit to a receiving station.

22. The method of claim 13, wherein the in-situ sensor is disposed underground at a position selected from the group consisting of inside of a monitoring well, inside of an extraction well, inside of an injection well, inside of a cone penetrometer, inside of a probe, and buried directly underground.

23. The method of claim 13, wherein the analysis begins after a remediation system has reduced the vapor concentration to below a pre-selected threshold level and the remediation system has been turned off, at which point the vapor concentration rebounds.

* * * * *